Jan. 3, 1928.
R. L. ELLERY
1,655,052
WINDOW CONTROLLER
Filed May 11, 1925
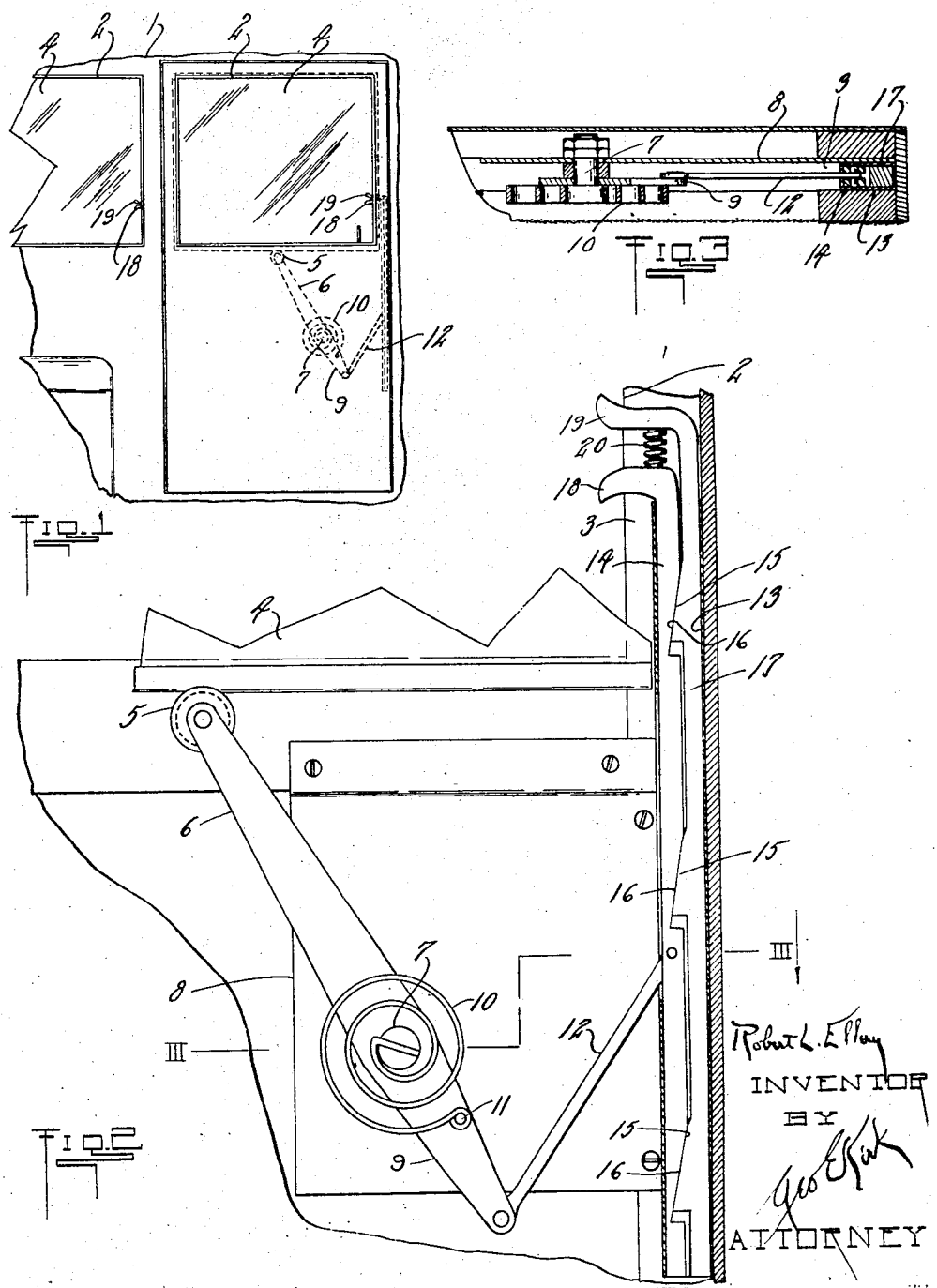

Patented Jan. 3, 1928.

1,655,052

UNITED STATES PATENT OFFICE.

ROBERT L. ELLERY, OF TOLEDO, OHIO.

WINDOW CONTROLLER.

Application filed May 11, 1925. Serial No. 29,451.

This invention relates to shifting windows and holding such windows as shifted.

This invention has utility when incorporated in so-called window lifters as used in connection with vertically shiftable lights or panes in motor vehicles to be effective for holding locked in different locations to which shifted, whether open, closed, or partially opened.

Referring to the drawings:

Fig. 1 is a fragmentary view of a motor vehicle having an embodiment of the invention incorporated therewith;

Fig. 2 is a view on an enlarged scale, with parts broken away, showing the assembly of the window shifter unit as to a window to be controlled thereby; and Fig. 3 is a section on the line III—III, Fig. 2.

Motor vehicle 1 is shown as having therein window openings 2 from which extend ways 3 so that windows 4, as controlled by rollers 5, may be held at different positions as shifted in the openings 2. Roller 5 is rotatably mounted on long arm 6 of lever rotatably mounted on bearing pin 7 as a fulcrum. This pin 7 is carried by bracket or plate 8 fixed with the motor vehicle 1. Oppositely extending from the long arm 6, the lever has short actuator arm 9. The non-rotative fulcrum pin or bearing 7 is shown as provided with a slot to engage the end of spiral torsion spring 10. The outer free end of this spring 10 is connected by pin 11 to short arm 9 of this lever 6, 9. Accordingly, this torsion spring is a counterpoise for longer window engaging arm 6 of this lever as loaded by the window 4. Actuation of this lever 6, 9, is effective through link 12 extending from the free end of the actuator arm 9.

Parallel with the way 3 for the descent of the window 4 is guide 13 in which is mounted controller 14, to which the link 12 is pivotally connected. This controller 14 is provided with wedge faces 15 which are opposed by complementary wedge faces 16 of bar 17 also in this guide 13. This controller 14 upwardly terminates in sectional grip portion 18 opposing sectional grip portion 19 of the bar 17. These grip portions 18, 19, are normally thrust apart by spring 20. This thrusting apart of the grip portions 18, 19, due to the action of the complementary wedge faces 15, 16, tends to cause this controller 14 and bar 17 to coact with the guide 13 as a frictional lock in holding the released controller 14 against shifting in the guide 13, thereby effectively locking the window 4 in such adjusted position, or fully opened, fully closed, or fractionally opened position as may be selected.

In the operation of this device, it is only necessary to grasp the grips 18, 19, and pull such toward each other against the resistance of the spring 20. The controller 14 is thus free in the way or guide 13 so that a downword thrust may cause the window 4 to be shifted upward as partially balanced by the counterpoise spring 10. For closing the window, the completion of downward travel of the controller 14 is adopted. At once, the grips 18, 19, are released, the spring 20 is effective to bring about the automatic locking for effective holding against vibration.

This structure is of few parts and is easily assembled in a compact relation and in a narrow space. It may be produced cheaply, while it is substantial to withstand rough usage and the vibration of motor vehicle usage.

What is claimed and it is desired to secure by United States Letters Patent is:—

1. A window operating unit comprising a bracket providing a fixed bearing, a lever fulcrumed at said bearing intermediate its length, having one way from said bearing an actuator arm and the other way from the bearing a window engaging arm, a link from the actuator arm, a torsion spring surrounding said bearing having one of its ends fixed thereto and its other end connected to said lever as a counterpoise for the window load on the window engaging arm, and a manually reciprocable controller connected to said link.

2. An operating unit comprising a window, a reciprocable controller bar independently of engaging the window having wedge means and a grip portion, window operating speed ratio changing connections from the bar for shifting the window by bar reciprocation in movement relatively to the window, a guide for the controller bar, a companion bar having complemental wedge means and a complementary grip portion, and a spring between the grip portions urging the grip portions apart, whereby collapsing the grip portions toward each other by grasping thereof against the resistance of said spring thereby releases said controller bar for reciprocation in said guide relatively to said window for effecting through said operating connections shifting operation of said window relatively to each of said bars.

In witness whereof I affix my signature.

ROBERT L. ELLERY.